(12) United States Patent
Blümel et al.

(10) Patent No.: US 6,859,610 B1
(45) Date of Patent: Feb. 22, 2005

(54) RECORDING DEVICE WITH A RECORD-PREPARED MODE FOR RECORDING DIGITAL DATA

(75) Inventors: Werner Blümel, Vienna (AT); Makoto Asano, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 1013 days.

(21) Appl. No.: 09/595,309

(22) Filed: Jun. 16, 2000

(30) Foreign Application Priority Data

Jun. 17, 1999 (EP) .............................................. 99890197

(51) Int. Cl.[7] .............................. H04N 5/91; H04N 7/00
(52) U.S. Cl. .............................. 386/46; 386/125; 360/31
(58) Field of Search ................................ 386/1, 45, 46, 386/83, 95, 98, 70, 125, 126; 360/31; 369/53.1; 725/20, 21, 58

(56) References Cited

U.S. PATENT DOCUMENTS

| | | | | |
|---|---|---|---|---|
| 5,495,282 A | * | 2/1996 | Mostafa et al. | ............... 725/20 |
| 6,295,086 B1 | * | 9/2001 | Fukushima et al. | ......... 386/125 |
| 6,415,098 B1 | * | 7/2002 | Taira | ........................... 386/95 |
| 6,711,343 B1 | * | 3/2004 | Matsumi et al. | .............. 386/46 |

FOREIGN PATENT DOCUMENTS

WO 9906916 A2 2/1999

* cited by examiner

*Primary Examiner*—Thai Tran
*Assistant Examiner*—Christopher Onuaku (57) ABSTRACT

A recording device for recording digital recording data in a recording mode of the recording device comprises data bus means to which a digital data bus can be connected and which are designed for receiving input data transmitted in at least a first input channel of the data bus. Received input data can be processed by processing means and be recorded as recording data on a data carrier by recording means of the recording device. The recording device further comprises test means for testing whether input data are received in the first input channel. Furthermore, a record-prepared mode can be activated in the recording device, and the test means, with the record-prepared mode being activated, are designed for activating the recording mode for recording input data received in the first and/or in at least one second input channel as recording data for the duration of reception of input data in the first input channel.

11 Claims, 3 Drawing Sheets

| CI | BI | PI | DF |
|---|---|---|---|
| C33(PC) | P+R | 4 | |
| C34(PC) | P | 4 | |

| CI | BI | PI | DF |
|---|---|---|---|
| C1(STB) | P+R | 1 | |
| C5(TV) | P+R | 3 | |
| C20(DV) | P+R | 2 | |
| C25(DV) | P+R | 5 | |
| C33(PC) | P+R | 4 | |

| CI | BI | PI | DF |
|---|---|---|---|
| C20(DV) | P+R | | DVCR |

RECORDING DEVICE WITH A RECORD-PREPARED MODE FOR RECORDING DIGITAL DATA

BACKGROUND OF THE INVENTION

The invention relates to a recording device as defined in the preamble of claim 1 and to a method as defined in the preamble of claim 11.

Such a recording device as defined in the preamble of claim 1 and such a method as defined in the preamble of claim 11 are known from the document WO 99/06916 and are formed by a video recorder and provided in a video recorder, respectively. The known video recorder is designed for recording digital data which comprise audio, video, and additional information in accordance with the DVHS standard.

The known video recorder comprises data bus means to which the data bus lines of a digital data bus can be connected. Further units—such as, for example, a set top box—are connected to the data bus lines, from which units transmission data can be provided to the data bus so as to be received as input data through the data bus means of the video recorder.

The data bus means of the video recorder are designed for receiving input data in accordance with the 1394 standard, which can be received in one or several input channels. Input data received in an input channel may comprise, for example, audio, video, and additional data coded in accordance with an MPEG-2 standard.

The known video recorder comprises processing means for processing audio, video, and additional data contained in input data and for supplying them to recording means of the video recorder as recording data in accordance with the DVHS standard. A recording mode can be activated in the known video recorder. When the recording mode is activated in the video recorder, input data received in one or several input channels can be recorded as recording data on a magnetic tape.

A timer-controlled recording session for recording input data to be received at a later moment can be programmed by a user in the known video recorder. When a timer-controlled recording was programmed in the video recorder, the known video recorder is set in a waiting mode in which the video recorder activates the recording mode for recording the desired input data under the control of a timer.

It was found to be a disadvantage in the known video recorder that the known video recorder cannot be switched to a waiting mode in which the video recorder activates the recording mode for recording input data received in one or several input channels in dependence on input data being received in one or several input channels of the digital data bus.

SUMMARY OF THE INVENTION

The invention has for its object to provide a recording device and a method of recording data in which and by which a waiting mode as mentioned above can be activated. This object is achieved in a recording device of the kind described in the opening paragraph by the measures defined in the characterizing part of claim 1, and in a method as described in the opening paragraph by the measures of the characterizing part of claim 11.

It is advantageously achieved thereby that, when the record-prepared mode is activated in the recording device, the recording means do not record data until input data actually desired for recording are being received. Input data received in a first input channel may here characterize the reception of input data designed to be recorded in a second input channel of the digital data bus, or may themselves be designed for being recorded. Advantageously, moreover, the recording mode for recording input data received in several input channels may be activated by the test means upon the reception of input data in the first input channel.

It is advantageously achieved by the measures of claims 2, 4, and 10 that the recording device complies with the standards which are usual today and is designed to cooperate with a large number of appliances which are commercially available.

The measures of claims 3 and 5 lead to the advantage that the test means evaluate a "Channels_Available Register" laid down in the 1394 standard, which signals or characterizes the reception of input data in an input channel, and/or a "CIP Header" laid down in the IEC61883 standard, which characterizes the actual reception and the nature of the received input data, with the result that the test means are very reliable and can be of a particularly simple construction.

The measures of claim 6 lead to the advantage that the first and/or second, and possibly further input channels can be programmed by a user of the recording device, and channel number information characterizing these input channels can be stored in a selection memory. Input channels characterized in this manner are used for testing by the test means, and/or input data provided for recording will be receivable in these input channels.

The measures of claim 7 lead to the advantage that also the relative importance or priority of the recording of input data received in an input channel can be programmed by a user of the recording device and can be stored in the selection memory. This is particularly advantageous when several input channels are programmed by the user for parallel recording on the data carrier of input data received in these input channels on the data carrier, while it is not known to the user whether the maximum data rate which can at most be recorded will be sufficient for recording all input data.

The measures of claim 8 lead to the advantage that data rate comparison means continuously test the instantaneous data rate of the recording data corresponding to input data provided for recording, and further input channels containing input data desired for recording are programmed for the recording means until the recording data have reached the maximum data rate. The maximum data rate, i.e. the maximum quantity of desired input data which can be recorded on the data carrier, is optimally utilized thereby.

The measures of claim 9 achieve the advantage that input data can be recorded on the data carrier with a higher total data rate because input data received from transcoding means are coded in a different coding process, in which they are compressed.

BRIEF DESCRIPTION OF THE DRAWING

The invention will be explained in more detail below with reference to five application examples of an embodiment shown in the Figures to which, however, the invention is by no means limited.

DESCRIPTION OF THE PREFERRED EMBODIMENTS

Figure 1:
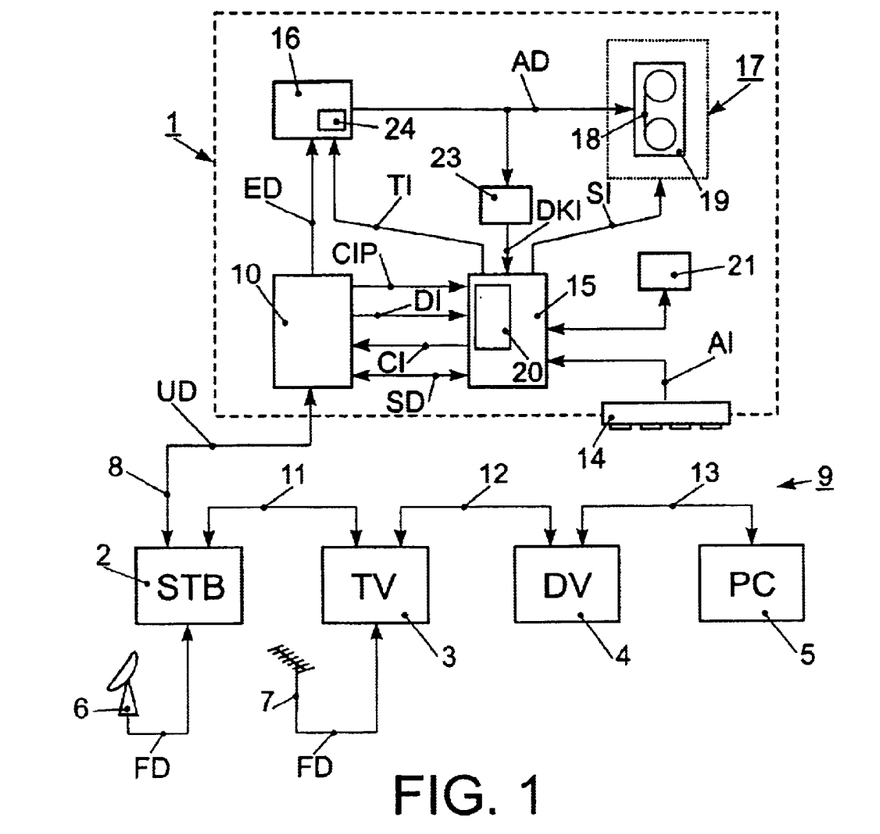
FIG. 1 is a block diagram of a video recorder which is connected through a digital data bus to a set top box, a TV set, a DV player, and a computer, and which comprises test means for testing whether input data are being received in an input channel of the data bus.
Figure 2:
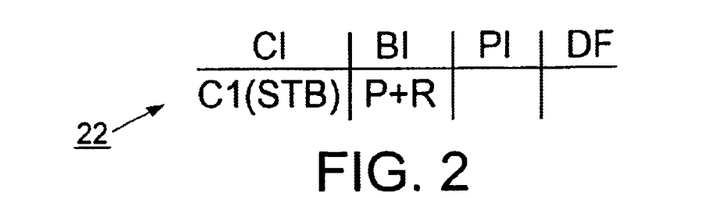
FIG. 2 shows a selection table stored in a selection memory of the video recorder of FIG. 1 in a first application example of the video recorder.
Figure 3:
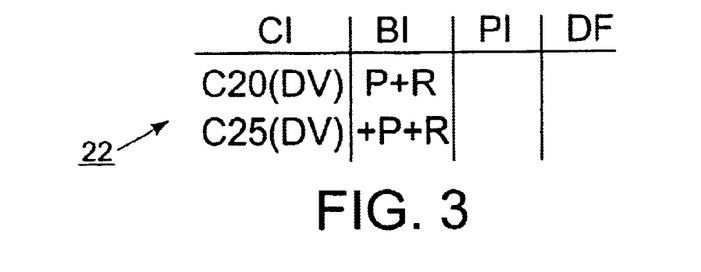
FIG. 3 shows a selection table stored in a selection memory of the video recorder of FIG. 1 in a second application example of the video recorder.
Figure 4:
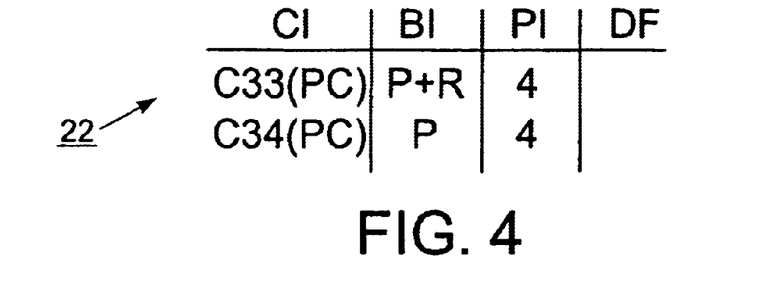
FIG. 4 shows a selection table stored in a selection memory of the video recorder of FIG. 1 in a third application example of the video recorder.

FIG. 1 shows a video recorder 1, a set top box 2, a TV set 3, a DV player 4, and a computer 5 in the form of a block diagram. A satellite antenna 6, by means of which digital TV data FD can be received, is connected to the set top box 2. TV data FD may comply, for example, with the DVB standard (Digital Video Broadcast) and contain a transport flow complying with the MPEG standard (MPEG standard (system): ISO/IEC13.818/1), whereby audio, video, and additional information from several TV broadcasts can be transmitted in parallel.

A terrestrial antenna 7, also capable of receiving digital TV data FD, is connected to the TV set 3. The TV set 3 is designed for processing digital TV data FD received with the terrestrial antenna 7 and for displaying audio, video, and additional information of a TV broadcast contained in received TV data FD.

The DV player 4 is designed for reproducing digital recording data recorded on a magnetic tape, which may comprise audio, video, and additional information of a TV broadcast and can be characterized as DVCR data. The computer 5 is designed for reproducing digital audio data stored on a hard disk of the computer 5, which data contain audio information and information complying with the MP3 standard. Furthermore, a transport flow complying with the MPEG standard and DVCR data can be reproduced from the hard disk of the computer 5.

The video recorder 1 forms a recording device and is designed for recording digital recording data AD containing audio, video, and additional information in a recording mode of the video recorder 1. Audio, video, and additional information, representing transmission data UD, can be supplied to the video recorder 1 through data lines 8 of a digital data bus 9.

The video recorder 1 comprises data bus means 10 to which the data lines 8 of the data bus 9 are connected. The set top box 2, the TV set 3, the DV player 4, and the computer 5 comprise data bus means which correspond to the data bus means 10 of the video recorder 1, but which are not shown in FIG. 1. The data bus means of the set top box 2 are connected to the video recorder 1 via the data lines 8 and to the TV set 3 via data lines 11 of the data bus 9. The data bus means of the TV player 4 are connected to the data bus means of the TV set 3 via data lines 12 of the data bus 9 and to the data bus means of the computer 5 via data lines 13 of the data bus 9.

All data bus means are designed for building up a transmission of transmission data UD in accordance with the IEEE-1394 standard (IEEE standard for a High Performance Serial Bus, IEEE Std 1394-1995, SH94364) and in accordance with the IEC61883 standard (Digital interface for consumer audio/video equipment: Part 1, Part 4; IEC61883). A transmission protocol is laid down in standard IEEE-1394 according to which both an isochronous and an asynchronous data transfer is possible through the data lines 8, 11, 12, and 13 of the data bus 9.

In the case of isochronous data transfer, digital transmission data UD containing audio information and video information can be transmitted in data packets in a fixed time frame. Transmission data UD may contain input data transmitted in parallel in up to 64 input channels, which data may comprise TV data FD, video data, or audio data.

In the case of asynchronous data transfer, control data SD are transmittable at any moments in time through the data bus 9. Control data SD may be transmitted to the video recorder 1 in this case, for example for activating an operational mode of the video recorder 1 with the set top box 2, or for ascertaining the activated operational mode of the video recorder 1 with the set top box 2.

Input data ED can be transmitted at a data rate of up to approximately 320 MBit/second in an isochronous data transfer, and control data SD can be transmitted with a data rate of up to approximately 80 MBit/second in an asynchronous data transfer. Accordingly, transmission data UD can be transmitted with a data rate of up to approximately 400 MBit/second in total with the data bus 9 complying with the IEEE-1394 standard.

When a device connected to the data bus 9 is disconnected, or a further device is connected to the data bus 9, a bus reset is triggered by the data bus means of the data bus 9. After a bus reset, an initialization process is carried through as laid down in the IEEE-1394 standard. All devices connected to the data bus 9 are assigned addresses in the initialization process, and one of the actions taken is that one device connected to the data bus 9 is selected as the so-called "Isochronous Resource Manager" for managing and storing a "Channels_Available Register". The video recorder 1 may here at the same time form the "Isochronous Resource Manager".

One bit is reserved in the "Channels_Available Register" for each of the 64 input channels, which indicates whether the input channel is reserved for a transmission taking place at that moment or a future transmission of transmission data UD through the data bus 9. Thus, for example, the bit "0" in the $10^{th}$ position of the "Channels_Available Register" indicates that the $10^{th}$ input channel is reserved for transmitting input data ED from a device connected to the data bus 9 to another device connected to the data bus 9. If a device wants to transmit input data ED to another device through the data bus 9, it must reserve an input channel characterized by the bit "1" in the "Channels_Available Register" for this purpose.

The IEC61883 standard lays down inter alia that a so-called "CIP Header" is transmitted in combination with each data packet transmitted in an isochronous data transfer. The "CIP Header" contains inter alia information as to which data format (for example MPEG, DVCR) the input data ED transmitted in data packets have.

The video recorder 1 comprises a keyboard 14 by means of which a user of the video recorder 1 can activate and deactivate operational modes of the video recorder. A relevant activation information AI can be supplied to control means 15 of the video recorder 1 by the keyboard 14. The control means 15 are designed for controlling the means present in the video recorder 1, which will be discussed in more detail further below. The control means 15 here are also capable of supplying a channel number information CI to the data bus means 10, which information characterizes one or several input channels.

The data bus means 10 are designed for receiving the transmission data UD transmitted through the data bus 9. From received transmission data UD, the data bus means 10 are capable of selecting and supplying those input data ED which are received in one input channel or several input channels which is/are characterized by a channel number information CI supplied by the control means 15 to the data bus means 10.

The data bus means 10 are furthermore designed for supplying a detection information DI to the control means 15 when input data ED are received through an input channel characterized by a channel number information CI. The data bus means 10 are furthermore designed for supplying control data SD received in an asynchronous data transfer to the control means 15 and for transmitting the control data SD supplied by the control means 15 to the data bus means 10 in the case of an asynchronous data transfer. The data bus means are in addition designed for reading the "CIP Header" of a data packet of received input data ED and for supplying a CIP Header information CIP to the control means 15, which will be discussed in more detail further below.

The video recorder 1 furthermore comprises processing means 16 which are designed for processing the input data ED given off by the data bus means 10. The input data ED are processed here in such a manner that the audio, video, and additional information contained in the input data ED are given out by the processing means 16 in the form of recording data AD complying with the DVHS standard (D-VHS System Standard, October 1997). According to the DVHS standard, recording data can be recorded on a magnetic tape up to a maximum data rate of approximately 13.8 MBit/second.

The video recorder 1 furthermore comprises recording means 17 for recording the recording data AD supplied by the processing means 16 on a data carrier, which is formed by a magnetic tape 18, of a video cassette 19. The recording means 17 here comprise a scanner with a head disc which can be driven into rotation, such as has long been known for digital video recorders.

When a user of the video recorder 1 activates the recording mode of the video recorder 1 with the keyboard 14, the keyboard 14 is capable of supplying a corresponding activation information AI to the control means 15, and the control means 15 can give a control information SI to the recording means 17. When this is done, the recording data AD supplied by the processing means 16 to the recording device 17 are recorded on the magnetic tape 18 in accordance with the DVHS standard.

The video recorder 1 furthermore comprises test means 20 for testing whether input data ED are being received in one or several input channels characterized by a channel number information CI. The test means 20 are furthermore designed for supplying a control information SI to the recording means 17 during the period in which input data ED are being received in the input channel(s) thus characterized, so as to record input data ED received in the input channel(s) characterized for testing and/or at least another characterized input channel as recording data AD. Tests can be carried out in four different test modes by the test means 20 for this testing process.

In a first test mode, a channel number information CI characterizing the input channel(s) to be tested can be supplied to the data bus means 10 by the test means 20. A detection information DI supplied by the data bus means 10 upon the presence of input data ED in the input channel(s) characterized by the channel number information CI can be supplied to the test means 20. The test means 20 are designed for supplying the control information SI mentioned above, for the purpose of recording the recording data AD, to the recording means 17 for the time period during which the detection information DI is being received.

In a second test mode, the test means 20 are designed for identifying the device connected to the data bus 9 through the output of control data SD, which device has formed the "Isochronous Resource Manager" since the latest bus reset and is in control of the "Channels_Available Register". In this case, the test means 20 are designed for scanning the "Channels_Available Register" once within each test period T, which may be, for example, 3 seconds, and for testing whether the bit of the "Channels_Available Register" of the input channel(s) characterized by a channel number information CI has the value "0", and whether accordingly input data ED are already being received in the characterized input channel or are about to be received very soon.

In a third test mode, the test means 20 are designed for testing the CIP Header information CIP supplied by the data bus means 10 to the test means 20. The test means 20 here test whether a CIP header of a data packet, which is received as input data ED in an input channel characterized by a channel number information CI, indicates a data format of the input data ED which is suitable for being recorded.

In a fourth test mode, the test means 20 are designed for testing a data rate information DKI supplied to the test means 20 and a priority information PI in order to ascertain whether an additional recording of input data ED from a further input channel characterized by a channel number information CI is possible. The four test modes will be discussed in more detail below with reference to five application examples.

Furthermore, a record-prepared mode can be activated by a user on the keyboard 14 in the video recorder 1. The user can specify here which input channel(s) is/are to be tested by the test means 20. The user can also indicate which input data ED of which input channel(s) are to be recorded in the case of a positive result of the test by the test means 20. An activation information AI comprising the information put in by the user can be supplied from the keyboard 14 to the control means 15 for activating the record-prepared mode.

A procedure is thereupon followed in the video recorder 1 in which it is tested, with the record-prepared mode activated in the video recorder 1, whether input data ED are received in an input channel characterized by a channel number information CI, and in which for the duration of reception of input data ED in the characterized input channel the input data ED received in this and/or in at least one other input channel are recorded as recording data AD.

The provision of a record-prepared mode advantageously achieves that recording data AD are only recorded by the recording means 17 when input data ED desired for recording are actually being received. On the one hand, the recording capacity of the magnetic tape 18 is effectively utilized thereby, while on the other hand unnecessary winding and rewinding operations of the magnetic tape 18 upon the playback of desired recording data AD are avoided.

The video recorder 1 further comprises a selection memory 21 in which a selection table 22 shown in FIGS. 2, 3, 4, 5, and 6 can be stored, which table contains the information put in by a user upon activation of the record-prepared mode and given off as activation information AI to the control means 15. The first column of the selection table 22 contains a channel number information CI, the second column a user information BI, the third column a priority information PI, and the fourth column a data format information DF. These items of information will be discussed in more detail below with reference to the application examples.

The provision of the selection memory 21 leads to the advantage that information put in by a user for activating the record-prepared mode can be stored in the selection memory 21.

The video recorder 1 furthermore comprises data rate comparison means 23 which are designed for comparing the instantaneous data rate of the recording data AD just recorded by the recording means 17 with the maximum data rate of 13.8 MBit/second of the maximum quantity of data AD which the recording means 17 are capable of recording. For this purpose, the recording data AD can be supplied to the data rate comparison means 23, and the data rate information DKI can be supplied to the test means 20 by the data rate comparison means 23. The test means 20, in the fourth test mode, are designed for evaluating the priority information PI entered in the selection table 22 and the data rate information DKI supplied to the test means 20, and for supplying said control information SI to the recording means 17 for the purpose of recording the recording data AD. This will be explained in more detail below with reference to the fourth application example.

The video recorder 1 furthermore comprises transcoding means 24 present in the processing means 16, which means 24 can be activated and deactivated by a transcoding means activation information TI supplied by the test means 20. The transcoding means 24 are designed, for example, for converting input data ED received in coded form in accordance with a DV coding method laid down in the DV standard into input data ED coded in accordance with the MPEG coding method, which will be discussed in more detail below with reference to the fourth application example.

FIG. 7 shows signal diagrams of input data ED which are received from a moment t0 up to a moment t11 from the set top box 2 in a first input channel S1(STB) of the data bus 9, from the TV set 3 in a fifth input channel C5(TV) of the data bus 9, from the DV player 4 in a 20$^{th}$ input channel C20(DV) and a 25$^{th}$ input channel C25(DV) of the data bus 9, and from the computer 5 in a 33$^{rd}$ input channel C33(PC) and a 34$^{th}$ input channel C34(PC) of the data bus 9.

It is assumed for the first application example of the video recorder 1 that the user wants to record on the magnetic tape 18 all the audio, video, and additional information which is receivable as input data ED on the input channel C1(STB) from the set top box 2. The user for this purpose enters the channel number information CI=C1(STB) and the user information BI=P+R (test+record) on the keyboard 14, the user information P+R in combination with the channel number information C1(STB) indicating that the input channel C1(STB) to be tested by the test means 20 will also contain the input data ED desired for recording.

An activation information AI containing the information put in by the user is supplied from the keyboard 14 to the control means 15. The control means 15 enter this information into the selection table 22 shown in FIG. 2 and store it in the selection memory 21, whereby the record-prepared mode has been activated. The test means 20 thereupon test the input channel C1(STB) in accordance with both the first and the second test mode.

According to the second test mode, the test means 20 ascertain that the TV set 3 has formed the Isochronous Resource Manager since the latest bus reset, and scan the actual value of the Channels_Available Register every three seconds. At moment to the test means 20 detect that the first position of the Channels_Available Register already contains the value "0" and is already prepared for transmitting input data ED originating from the set top box 2.

According to the first test mode, the test means 20 thereupon supply the channel number information C1(STB) to the data bus means 10 for monitoring. The data bus means 10 detect input data ED1 in the input channel C1(STB) under test at moment t1 and supply a corresponding detection information DI to the test means 20 from this moment t1. The test means 20 then supply a control information SI to the recording means 17 from the moment t1 for the purpose of recording the input data ED1 received in the input channel C1(STB) as recording data AD.

No more input data ED are detected by the data bus means 10 from moment t11 onwards, and accordingly no detection information DI is supplied anymore. The control means 15 give no more control information SI to the recording means 17, and the recording of recording data AD is terminated at moment t11.

This leads to the advantage that the recording means 17 do not record during time periods in which no input data ED are received in the characterized input channel C1(STB), i.e. from moment to t0 moment t1 and from moment t11 until the record-prepared mode is deactivated. On the one hand the recording capacity of the magnetic tape 18 is effectively utilized in this manner, while on the other hand unnecessary winding and rewinding operations of the magnetic tape 18 upon a subsequent playback of desired recording data AD are avoided.

It is assumed in the second application example of the video recorder 1 that the user wants to record on the magnetic tape 18 all audio and video information supplied as input data ED by the DV player 4 on the input channel C20(DV). In addition, the user wants to record those additional information data supplied by the DV player 4 as input data ED in the input channel C25(DV) which are received simultaneously with input data ED received in the input channel C20(DV). Further additional data received as input data ED in the input channel C25(DV), which are not received simultaneously with input data ED received in the input channel C20(DV), are not required for recording by the user. The user for this purpose enters the corresponding information on the keyboard 14, which information is entered in the selection table 22 shown in FIG. 3 and is stored in the selection memory 21, whereby the in record-prepared mode has been activated.

Subsequently the test means 20, in the first and the second test mode, test the input channel C20(DV) and additionally also the input channel C25(DV). Control information SI supplied by the test means 20 to the recording means 17 on the basis of the above have the result that from the moment t3 the input data ED3 received in the input channel C20(DV) and the input data ED5 received in the input channel C25(DV) are recorded. Then the input data ED4 and ED6 are recorded from moment t6 up to moment t7.

The advantage is achieved thereby that input data ED5 not marked for recording by the user are not recorded from moment t2 up to moment t3. It is apparent from this second application example that any logic conditions for recording input data ED3 received in one or several input channels can be programmed by the user.

It is assumed for the third application example of the video recorder 1 that the user wants to record on the magnetic tape 18 only certain audio and video information which can be received as input data ED in the input channel C33(PC) from the computer 5. These certain input data ED, which are receivable in the input channel C33(PC), are characterized by the reception of input data in the input channel C34(PC), which, however, are not to be recorded. To activate such a record-prepared mode, the user enters the corresponding information on the keyboard 14, which information is entered in the selection table 22 shown in FIG. 4 and is stored in the selection memory 21.

The test means, in the first and the second test mode, then test the input channel C34(PC) and supply a control information SI to the recording means 17 from moment t5 up to moment t8 for recording the input data ED7 received over the input channel C33(PC) up to moment t8.

This provides the advantage that input data ED7 not required by the user for recording are not recorded from moment t8 up to moment t9, and also input data ED8 are not recorded, so that the recording capacity of the magnetic tape 18 is effectively utilized. An additional advantage of this is that the recording of recording data AD by means of the video recorder 1 with the computer 5 can be activated by the supply of input data ED in the input channel C34(PC).

It is assumed for the fourth application example of the video recorder 1 that the user wants to record input data ED received in the input channels C1(STB), C5(TV), C20(DV), C25(DV), and C33(PC). Since a simultaneous reception of input data ED in all these input channels could cause the data rate of the recording data AD to be recorded to exceed the maximum data rate of 13.8 MBit/second, the user enters a priority information PI for each input channel on the keyboard 14. A low value of the priority information PI of a input channel here indicates a higher priority for the recording of input data ED received through this input channel. The corresponding information is put in by the user on the keyboard 14, which information is entered in the selection table 22 shown in FIG. 5 and is stored in the selection memory 21, whereby the record-prepared mode has been activated.

Figure 5:
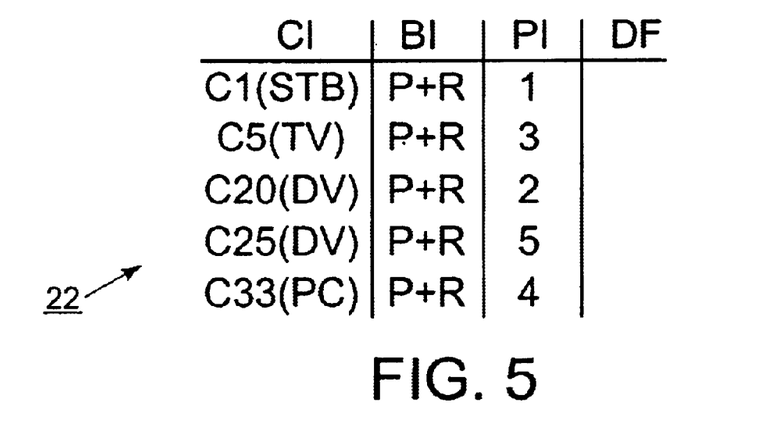
FIG. 5 shows a selection table stored in a selection memory of the video recorder of FIG. 1 in a fourth application example of the video recorder.
Figure 6:
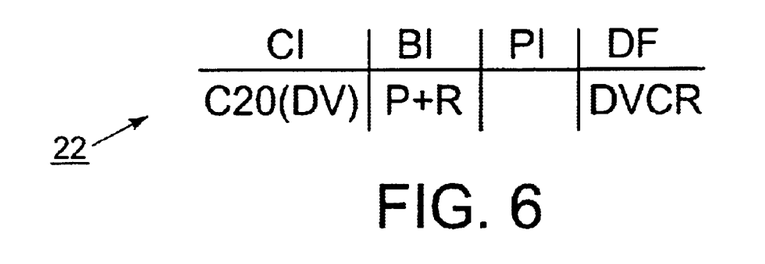
FIG. 6 shows a selection table stored in a selection memory of the video recorder of FIG. 1 in a fifth application example of the video recorder.
Figure 7A:
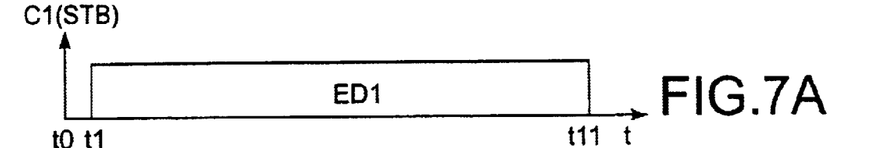
FIG. 7 shows signal gradients of input data received in six input channels of the data bus by data bus means of the video recorder of FIG. 1.
Figure 7B:
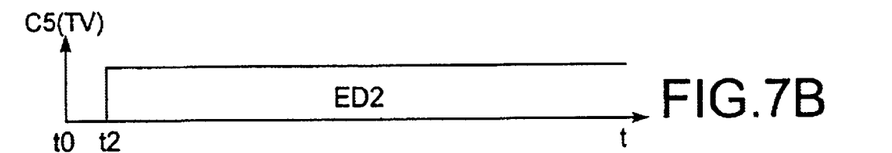
Figure 7C:
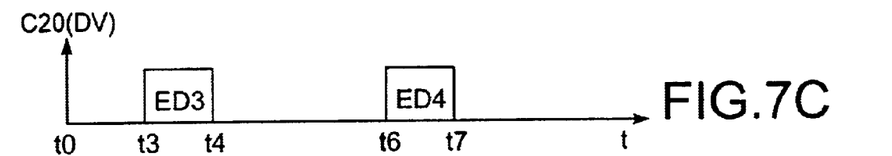
Figure 7D:
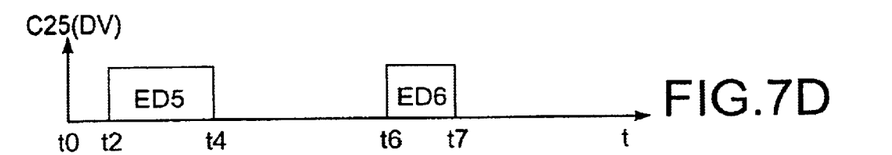
Figure 7E:
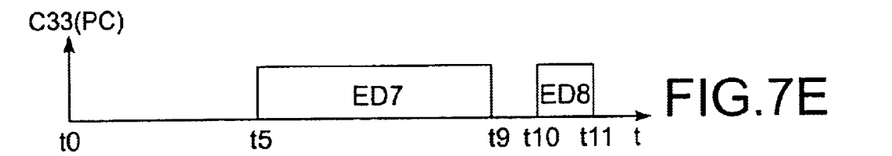
Figure 7F:
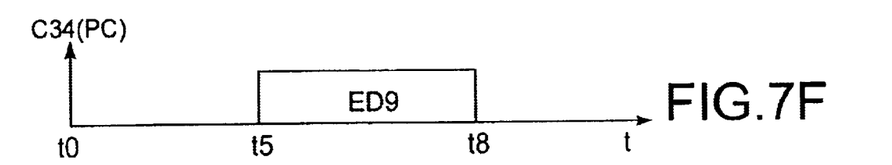

The test means 20, in the first and the second test mode, then test whether input data ED are received in one of the input channels entered in the selection table 22. When a detection information DI supplied by the data bus means 10 marks the reception of input data ED in one of these input channels, the test means 20 enter the fourth test mode and test whether a recording of recording data AD now also including these input data ED is possible. The test means 20 in this case test the data rate information DKI supplied by the data rate comparison means 23, which characterizes the actual data rate of recording data AD just recorded, as well as the priority information PI stored in the selection memory 21.

As a result of the test by the test means 20, the input data ED1 having a data rate of 7 MBit/second are recorded from moment t1, and in addition the input data ED2 having a data rate of 5 MBit/second and the input data ED5 having a data rate of 0.5 MBit/second are additionally recorded starting from moment t2:
(7 MBit/s+5 MBit/s+0.5 MBit/s=12.5 MBit/s<13.8 Mbit/s).

It should be noted that for simplicity's sake the data rates indicated for the input data ED are those data rates which the recording data AD containing these input data ED have. It is these data rates which are compared with the maximum data rate by the data comparison means 23.

Starting from moment t3, input data ED3 having a data rate of 6 MBit/s are received in the input channel C20(DV), which was given the priority information PI=2 in the selection table 22. A recording of all simultaneously received input data ED1, ED2, ED3, and ED5 as recording data AD from moment t3 is not possible because of the maximum data rate of 13.8 MBit/s of the recording means 17:
(7 MBit/s+5 MBit/s+0.5 MBit/s+6 MBit/s=18.5 MBit/s>13.8 MBit/s).

The test means 20 thereupon test the priority information PI for the input channels C1(STB), C5(TV), C20(DV), and C25(DV) stored in the selection memory 21 and detect that a recording of the input data ED1, ED2, and ED3 having high priority:
(7 MBit/s+5 MBit/s+6 MBit/s=18 MBit/s>13.8 MBit/s) is not possible. The test means 20 further detect that a recording of input data ED5 having only a low priority is possible in addition to the input data ED1 and ED3 of high priority:
(7 MBit/s+6 MBit/s+0.5 MBit/s=13.5 MBit/s<13.8 MBit/s). The control means 15 then supply a channel number information CI characterizing the input channels C1(STB), C20 (DV), and C25 (DV) to the data bus means 10 for recording the input data ED1, ED3, and ED5 starting from moment t3 up to moment t4.

From moment t4 to moment t5, the input data ED1 and ED2 are recorded. Input data ED7 received in the input channel C33(PC) from moment t5 have a data rate of 6 MBit/s. The test means 20 conclude from the priority information PI stored in the selection memory 21 that the input channel C33(PC) was given only a low priority, for which reason only the input data ED1 and ED2 are recorded up to moment t6.

Starting from moment t6, input data ED4 are received in the input channel C20(DV) and input data ED6 are received in the input channel C25(DV), each having a data rate of 6 MBit/s. After testing by the test means 20, these test means 20 supply a channel number information CI characterizing the input channels C1(STB) and C20(DV) to the data bus means 10 for recording the input data ED1 and ED4 from moment t6.

From moment t7 up to moment t11, the input data ED1 and ED2 are recorded. Starting from a moment t10 up to the moment t11, input data ED8 received in the input channel C33(PC) have a data rate of 10 MBit/s. Since the recording of input data ED8 received on the input channel C33(PC) have a lower priority than the recording of the input data ED1 and ED2, the input data ED8 are not recorded. The input data ED2 are recorded from moment t11 up to the moment of deactivation of the record-prepared mode.

This provides the advantage that the data rate comparison means 23 continuously test the actual data rate of the recording data AD corresponding to input data ED provided for recording, and the recording means 17 record recording data AD containing desired input data ED until the maximum data rate is reached. The maximum recordable data rate for the recording of desired input data ED is thus optimally utilized on the magnetic tape 18.

It is to be noted that the test means 20 are designed for supplying the transcoding means activation information TI to the transcoding means 24 so as to reduce the actual data rate of the recording data AD corresponding to input data ED desired for recording. In this case, for example, the test means 20 could supply the transcoding means activation information TI to the transcoding means 24 in the fourth application example at moment t3, from which moment a recording of all desired input data ED1, ED2, ED3, and ED5 is not possible because of an actual data rate which exceeds the maximum data rate.

The transcoding means 24 would thereupon, for example, decode the input data ED1, ED2, and ED3 coded in accordance with a first coding method and subsequently code them in accordance with a second coding method, with the result that the input data ED1, ED2, and ED3 would each now have a low data rate of, for example, 4 MBit/s. Recording of all input data ED1, ED2, ED3 and ED5 desired for recording from the moment t3 would then advantageously be possible.

It is assumed for the fifth application example of the video recorder 1 that the user wants to record on the magnetic tape 18 certain audio and video information received as input data ED from the computer 5 in the input channel C33(PC). These certain input data ED in the input channel C33(PC) are DVCR data and are characterized by the DVCR data format in a CIP Header. Input data ED having a different data format are not required by the user because he does not have a suitable playback device. The user for this purpose enters the corresponding information on the keyboard 14, which information is entered in the selection table 22 shown in FIG. 6 and is stored in the selection memory 21, whereby the record-prepared mode has been activated.

The test means 20 in the first and the second test mode then test whether input data ED are received on the input channel C33(PC). A detection information DI supplied by the data bus means 10 from moment t5 indicates that input data ED7 are being received. At the same time, a CIP Header information CIP derived by the data bus means 10 from the CIP Header of the data packets of the received input data ED7 is supplied to the test means 20. The test means 20 in the third test mode test the data format of the input data ED7 on the basis of the CIP Header information supplied to the test means 20 and detect that the input data ED7 contain a transport flow in accordance with the MPEG standard. The test means 20 accordingly give no control information SI for recording the input data ED7 to the recording means 17.

Starting from a moment t10, input data ED8 are received in the input channel C33(PC), containing DVCR data, i.e. having the desired data format. The test means 20 thereupon give a control information SI for the recording of the input data ED8 to the recording means 17.

This leads to the advantage that only those input data ED which have a desired data format are recorded by the recording means 17.

It may be noted that the video recorder 1 may alternatively comprise a SCART connector in accordance with the SCART standard (EN 500 49-1, EN 501 57-2-1, -2, -3) for the reception of analog audio, video, and additional information. A control information supplied to a pin 8 of the SCART connector could be passed on to the test means 20 of the video recorder 1 for activating the recording of recording data AD. It is also possible here for the transcoding means 24 to digitize analog audio and video information received through the SCART connector and to record it as digital recording data AD with the recording means 17.

It is to be noted that a recording device according to the invention may also be designed for recording on a compact disc or a hard disk.

It is to be noted that a recording device according to the invention may also comprise data bus means which transmit input data in accordance with a different digital transmission protocol.

What is claimed is:

1. A recording device for recording digital recording data in a recording mode of the recording device with data bus means to which a digital data bus can be connected and which are designed for receiving input data transmitted in at least a first input channel of the data bus, and with processing means for processing received input data and for providing recording data, and with recording means for recording the recording data on a data carrier in the recording mode, wherein a record-prepared mode can be activated in the recording device, test means are provided for testing whether input date are being received in the first input channel, and when the record-prepared mode is activated, the test means are capable of activating the recording mode for recording as recording data input data received in the first and/or in at least one second input channel for the time duration of reception of input data in the first input channel.

2. The recording device of claim 1, wherein the data bus means are designed for receiving input data of a digital data bus complying with the 1394 standard, that is the EEE Standard for a High Performance Serial Bus, IEEE Std 1394-1995, SH94364.

3. The recording device of claim 2, wherein the test means, while testing whether input data are being received in a first input channel, are designed for testing a "Channels_Available Register" as laid down in the 1394 standard.

4. The recording device of claim 2, wherein the data bus means are designed for receiving input data of a digital data bus which complies with the IEC61883 standard, that is, the Digital Interface for consumer audio/Video equipment: Part 1, Part 4: IEC61883.

5. The recording device of claim 4, wherein the test means, while testing whether input data are being received in a first input channel, are designed for testing a "CIP Header" as laid down in the IEC61883 standard.

6. The recording device of claim 1, wherein a selection memory is provided in which a channel number information which characterizes at least the first input channel and/or a channel number information which characterizes at least the second input channel can be stored.

7. The recording device of claim 6, wherein a priority information associated with at least one channel number information can be stored in the selection memory, which priority information indicates the priority of the recording of input data received in the input channel characterize by the channel number information.

8. The recording device of claim 1, wherein data rate comparison means are provided which are designed for comparing the actual data rate of the recording data recorded by the recording means with a maximum data rate being the maximum quantity of recording data which can be recorded by the recording means, and in that the recording means are capable of recording input data from several input channels up to said maximum quantity of recording data corresponding to the maximum data rate.

9. The recording device of claim 1, wherein transcoding means are provided for transcoding received input data coded in accordance with a first coding system into processed input data coded in accordance with a second coding system with a reduced data rate.

10. The recording device of claim 1, wherein the processing means are suitable for processing and outputting and the recording means are suitable for recording of recording data which comply with the DVHS standard, that is, the October 1997 DVHS System Standard.

11. A method of recording digital recording data by means of a recording device, comprising:

receiving of input data transmitted in at least a first input channel of a digital data bus, processing of the received input data and supplying recording data, and recording the recording data on a data carrier, wherein it is tested in the case of an activated record-prepared mode in the recording device whether input data are being received in the first input channel, and in that the input data received in the first and/or in at least one second input channel are recorded as recording data for the duration of reception of input data in the first input channel.

* * * * *